United States Patent
Biddlecome

Patent Number: 5,922,430
Date of Patent: Jul. 13, 1999

[54] COMPACT DISK PROTECTOR

[76] Inventor: Robert L. Biddlecome, 224 Tahoe Dr., Carson City, Nev. 89703

[21] Appl. No.: 09/054,015

[22] Filed: Apr. 2, 1998

Related U.S. Application Data

[51] Int. Cl.[6] ................................ B32B 3/02; B32B 3/04
[52] U.S. Cl. ......................... 428/66.6; 369/291; 428/128
[58] Field of Search .................................. 428/66.6, 66.7, 428/128; 369/291

[56] References Cited

U.S. PATENT DOCUMENTS

| | | | |
|---|---|---|---|
| 4,590,493 | 5/1986 | Inoue et al. | 346/135.1 |
| 4,879,710 | 11/1989 | Iijima | 369/291 |
| 4,950,520 | 8/1990 | Imai et al. | 428/64 |
| 4,956,215 | 9/1990 | Fujita et al. | 428/64 |
| 4,983,437 | 1/1991 | Merrick | 428/40 |
| 5,059,473 | 10/1991 | Takahashi et al. | 428/162 |
| 5,077,120 | 12/1991 | Kato et al. | 428/200 |

OTHER PUBLICATIONS

"Hostaphan" brochure; Hoechst Diafoil Co., Greer, SC; 11 pp; Oct. 96.

*Primary Examiner*—Alexander S. Thomas
*Attorney, Agent, or Firm*—Sheldon & Mak

[57] ABSTRACT

A compact disk protector for an optical data storage disk includes a thin, transparent sheet having an inside diameter being larger than an inner hole of the disk and the sheet extending within and being bounded by a main region for placement against a first side of the disk, and approximately 24 circumferentially spaced support portions extending radially outwardly from the main region to a distance being greater than a thickness of the disk beyond the disk outside diameter. Each support portion has a bridge width being not greater than 2 percent of the disk outside diameter within a bridge region that is concentric with the inside diameter and extends from the disk outside diameter radially outwardly a distance corresponding to the disk thickness. A retainer holds the support portions folded against a second side of the disk when the main region of the sheet is placed against the first side of the disk, the inside diameter of the sheet being maintained concentric with the disk outside diameter by the bridge portions engaging outside edge portions of the disk, the retainer being a thin, sheet having an inside diameter larger than the inner hole of the disk, the sheet being smaller than the disk and having adhesive applied to one side for contacting the support portions.

19 Claims, 4 Drawing Sheets

COMPACT DISK PROTECTOR

BACKGROUND

The present invention relates to optical data disks such as compact disks, and more particularly to devices for protecting disks from damage by scratching and the like, that can be applied by users of the disks.

Data disks such as compact disks and video disks typically have large amounts of digitally stored information that is optically readable through a transparent bottom layer of the disk by a movable head during rotation of the disk. The information is arranged in one or more tracks that are covered by a thin protective top layer of the disk that can have labeling applied thereto such as by silkscreening. Normal handling of the disk can result in scratching of the bottom layer, resulting in loss of data by interference with the optical path such as by loss of focus and/or lateral image displacement. Also, data can be lost by scratching of the protective layer which is typically very thin, on the order of 20 microns, resulting in removal of information from a vapor deposited metal layer that is only about 0.1 micron thick. Even the loss of a small portion of the information can be catastrophic in that normal reading of information past a damaged portion is blocked in many systems. U.S. Pat. No. 4,983,437 to Merrick discloses a compact disk protector in the form of a polymer disk having a self-adhesive backing for application onto the protective layer of the data disk. The protective disk can be transparent for viewing the labeling, or it can have other indicia applied thereto. A disadvantage of the disk protector of Merrick is that it is unsuitable for protecting the bottom disk layer, in that optical transmission through the adhesive backing is ineffective, being excessively attenuated and irregular. Also, the protector is not readily replaceable in that the protective layer is subject to failure during attempted peeling of the protector, and residual adhesive that is likely to be left behind is objectionable.

Thus there is a need for a disk protector that overcomes the disadvantages of the prior art.

SUMMARY

The present invention meets this need by providing a thin transparent sheet having a main region that can be supported directly against a disk without an intervening adhesive layer that would interfere with optical data access through the sheet. In one aspect of the invention, a compact disk protector for an optical data storage disk includes a thin, transparent sheet having an inside diameter being larger than an inner hole of the disk, the sheet extending within and being bounded by a main region for placement against a first side of the disk, the main region extending concentrically from the inside diameter to a main diameter being slightly less than an outside diameter of the disk; and a circumferentially spaced plurality of support portions extending radially outwardly from the main region to a distance being greater than a thickness of the disk beyond the disk outside diameter, each support portion having a bridge width being not greater than 5 percent of the disk outside diameter within a bridge region, the bridge region being concentric with the inside diameter and extending from the disk outside diameter radially outwardly a distance corresponding to the disk thickness; and a holder for holding the support portions folded against a second side of the disk when the main region of the sheet is placed against the first side of the disk, the inside diameter of the sheet being maintained concentric with the disk outside diameter.

Preferably each support portion is confined within a pie-shaped region that converges toward a point located radially outwardly from the bridge region and spaced approximately half of the disk outside diameter therefrom, the pie-shaped region subtending an angle corresponding to an angular spacing of the support portions for permitting the support portions to be folded against the second disk surface in close edge-to-edge relation without overlapping. The support portion can be further confined outside of a circular clearance region being larger than the inside hole of the disk and centered at the point. A heel portion of the pie-shaped region can be within a circular heel region being smaller than the disk outside diameter and centered at the point, so that, when the support portions are folded in closely facing relation over the outside perimeter of the disk and the second surface, the support portions project outwardly from the second surface only within the bridge width.

Preferably the compact disk protector includes at least 12 of the support portions for a desired even distribution of support about the perimeter of the disk. more preferably, the compact disk protector includes approximately 24 of the support portions for a desired combination of improved support without excessive pattern complexity. The bridge width can be approximately 2 percent of the disk outside diameter.

Preferably the compact disk protector has polar symmetry for preventing rotational unbalance thereof. Preferably the protector further includes an adhesive for connecting the support portions. The adhesive can be distributed on the support portions, for anchoring the support portions directly against the second disk surface. Preferably the compact disk protector further includes a retainer member that is a thin, sheet having a retainer inside diameter being larger than the inner hole of the disk, the sheet being bounded within a diameter corresponding to the disk outside diameter, the adhesive being applied to one side of the retainer member for contacting and tying the support portions without the adhesive contacting the disk when the support portions have the preferred configuration having close edge-to-edge spacing. Concentricity of the protector relative to the disk is maintained by the bridge portions engaging outside edge portions of the disk. The retainer member can be circular, having an outside diameter being concentric with the retainer inside diameter, the clearance diameter of the support portions being not smaller than the retainer inside diameter. The retainer member, together with the adhesive, can be transparent.

A protected compact disk can include a data storage disk in combination with the compact disk protector, the disk being confined between the main region and the support portions.

In another aspect of the invention, a method for protecting a compact disk having an inner hole therein, includes the steps of:
(a) providing a thin, transparent sheet having an inside diameter being larger than an inner hole of the disk, the sheet having a main region, the main region extending concentrically from the inside diameter to an intermediate diameter being slightly less than an outside diameter of the disk, and a circumferentially spaced plurality of support portions extending radially outwardly from the main region;
(b) placing the main region against a first side of the disk with the support portions extending from the first side;
(c) folding each of the support portions over an edge portion of the disk into facing relation to a second side of the disk; and (d) connecting the support portions for retaining the disk between the main region and the support portions.

The connecting step can include applying an adhesive to the supporting portions. The connecting step can further include using the adhesive directly between the support portions and the second side of the disk. The connecting step include the further steps of:

(a) providing a thin sheet retainer member having the adhesive on one surface thereof; and (b) placing the retainer against the support portions with the adhesive therebetween while maintaining the support portions folded against the second side of the disk.

DRAWINGS

These and other features, aspects, and advantages of the present invention will become better understood with reference to the following description, appended claims, and accompanying drawings, where:

DESCRIPTION

Figure 2:
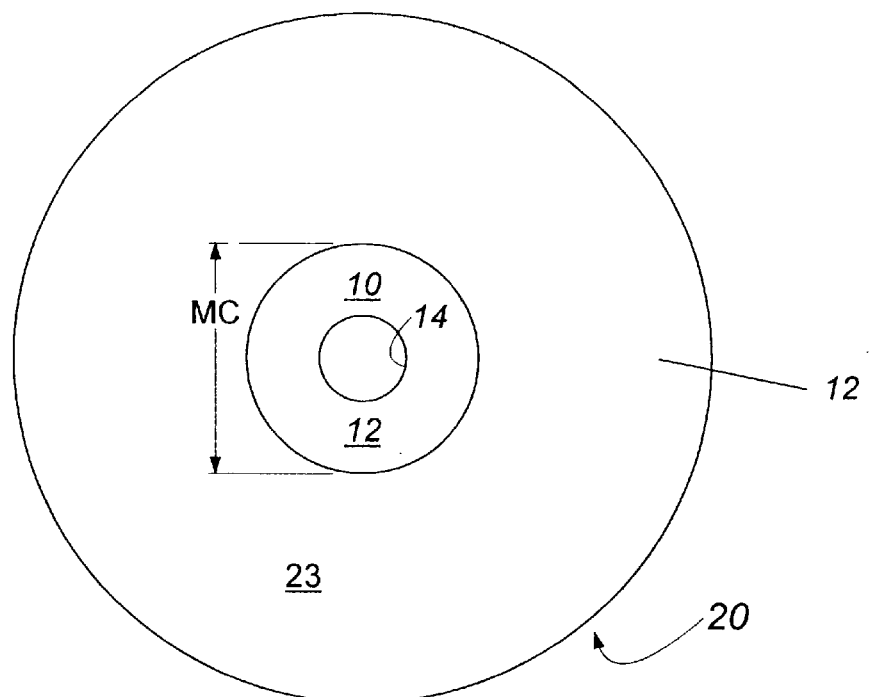
FIG. 2 is a bottom view of the protected disk of FIG. 1.

The present invention is directed to a user-installable protection device for an optically readable storage disk such as a compact disc (CD), a video disk, etc. With reference to FIGS. 1–5 of the drawings, a storage disk 10 having an outside diameter OD, a thickness DT, a top surface 11, a bottom surface 12, an outside edge 13, and a center hole 14 is confined within a disk protector 20 according to the present invention. The protector 20 includes a thin main sheet member 22 having a transparent main region 23 for placement against the bottom disk surface 12, and a plurality of outwardly projecting support portions 24 that are folded over the outside edge 13 and against the top surface 11 of the disk 10. A circular main clearance opening 26 of diameter MC is centrally located within the main region 22, the opening 26 being larger than the center hole 14. The main region 21 extends concentrically about the clearance opening 26 within a main diameter MD that is slightly less than the disk outside diameter OD.

Each support portion 24 extends radially outwardly beyond the outside diameter OD sufficiently more than the disk thickness DT for permitting the support portion 24 to be folded against the top surface 11 of the disk 10. Within a bridge region 25 that extends outwardly from the outside diameter OD a bridge distance B corresponding to the disk thickness DT, each support portion 24 is limited to a bridge width W that is not more than 5 percent of the outside diameter OD for permitting the bridge region 25 to be folded in close conformity with the outside edge 13 without requiring compound curvature.

Figure 1:
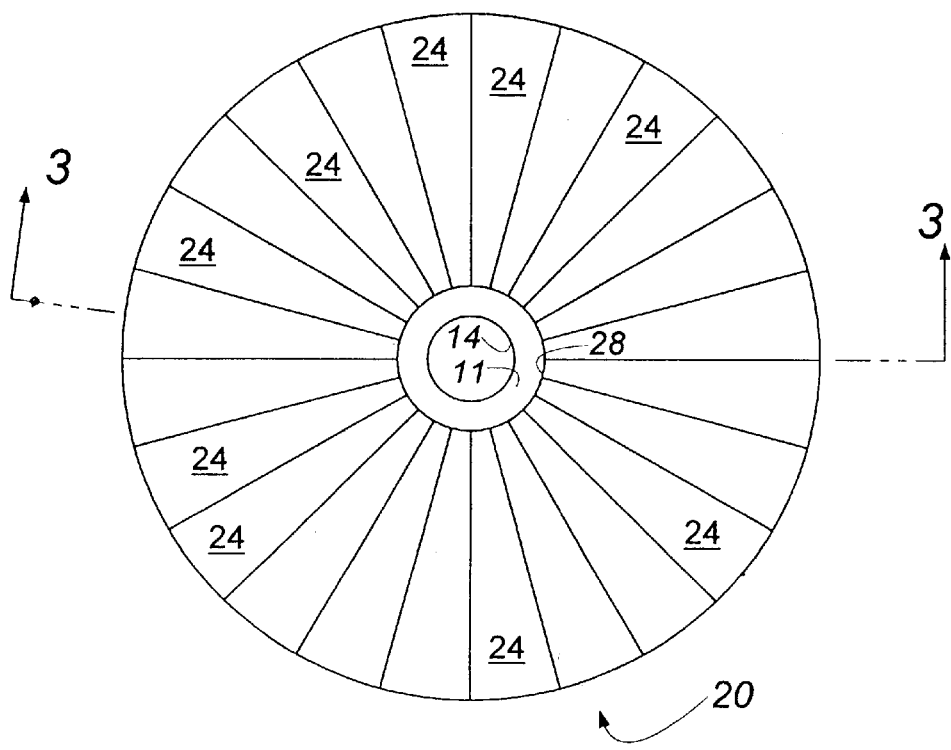
FIG. 1 is a top plan view of a data disk having a disk protector installed thereon according to the present invention.
Figure 5:
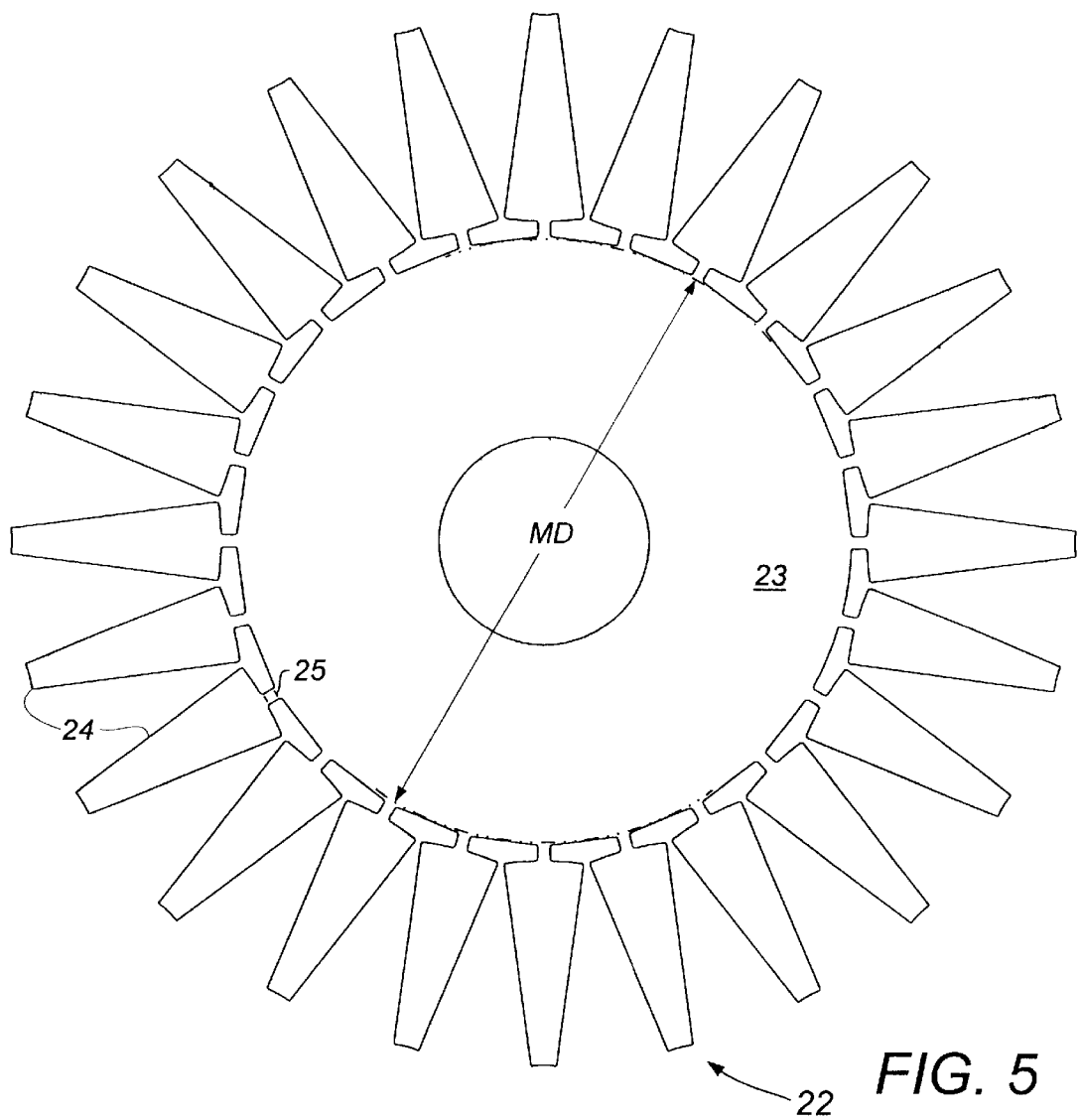
FIG. 5 is a plan view of a main sheet portion of the disk protector of FIG. 1.
Figure 3:
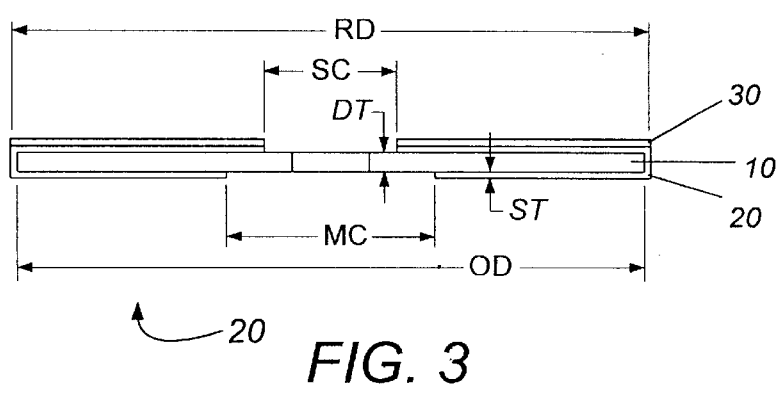
FIG. 3 is a lateral sectional view of the protected disk of FIG. 1 in line 3—3 therein.
Figure 4:
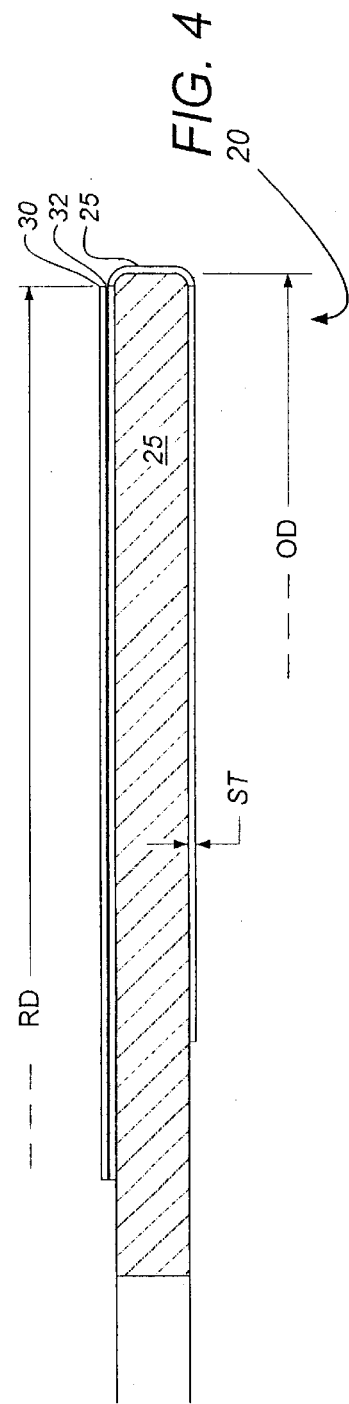
FIG. 4 is a detail sectional view showing a portion of the protected disk as in FIG. 2.
Figure 6:
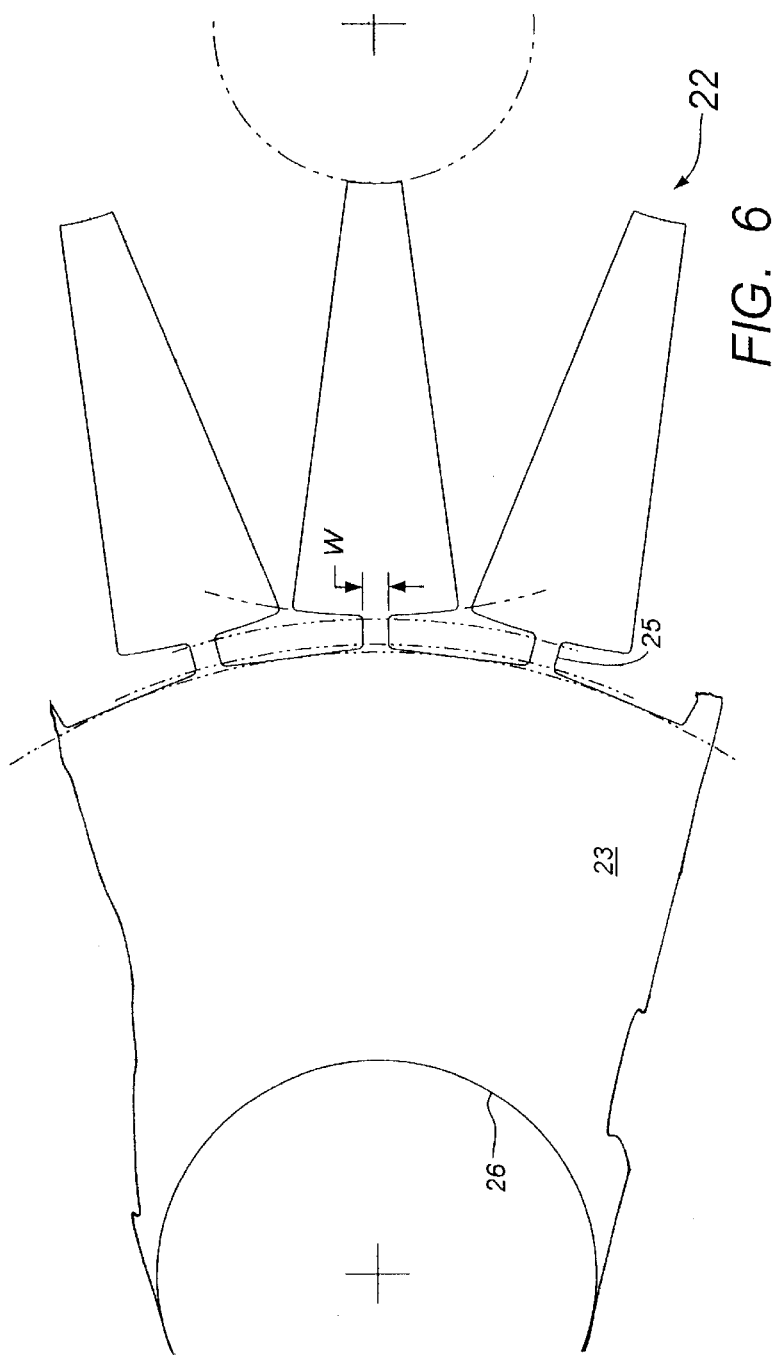
FIG. 6 is a detail view of a portion of the sheet portion of FIG. 5.

As further shown in the drawings, the support portions 24 are enlarged beyond the bridge region 25 for substantially covering the top disk surface 11 outside of a secondary clearance diameter SC of the disk protector 20 as shown in FIG. 1. Preferably the support portions 24 do not overlap; accordingly, each support portion is confined within a pie-shaped region that subtends an angle φ about an apex point 27 spaced approximately half of the outside diameter OD radially outwardly beyond the corresponding bridge region 25 in a flattened condition of the main sheet member 22. The angle φ corresponds to an angular spacing of the support regions 24. The support portions 24 are congruent and equally spaced for maintaining rotational balance of the protector 20. In the preferred configuration as shown in the drawings, there are 24 of the support portions 24 (the angle φ being 15°). Practical limits are at least 16 of the support portions (the angle φ being 22.5°) for providing sufficient support of the main region 23, and not more than 36 (the angle φ being 10°) for avoiding excessive complexity that does not significantly improve the support.

Each support portion is further confined outside of a circular clearance region 28 that is larger than the inside hole 14 and centered at the apex point 27, the apex points 27 being nominally superimposed at the center of the inside hole 14 when the disk protector 20 is installed on the disk 10. Thus the support portions 24 in the installed condition are confined outside of a secondary clearance diameter SC corresponding to the superimposed clearance regions 28. The enlargements of the support portions 24 beyond the bridge regions 25 are further confined within a circular heel region 29 that is concentric with the clearance region 28 and having a heel diameter HD that is smaller than the disk outside diameter OD, for preventing outside extremities of the support portions 24 from projecting beyond the outside edge 13 of the disk.

In an exemplary and preferred configuration, the protector 20 also includes a retainer sheet 30 having an adhesive coating 32 for securely connecting and thereby holding the support portions in coplanar relation proximate the top disk surface 11. The retainer 20 has an outside diameter RD corresponding to the main diameter MD of the main sheet member 22, and a concentric inside diameter corresponding to the secondary clearance diameter SC. Typically, the adhesive coating 32 has a conventional peelable protective covering thereon (not shown).

Suitable materials for the main sheet member 22 and the retainer sheet 30 include clear or transparent polymers such as Mylar®, which is available from McMaster-Carr of Los Angeles, Calif. Another suitable material is Hostaphan® polyester film, available from Hoechst Diafoil of Greer, S.C. Preferably the sheet member 22 has a light transmission capability of 98%.

Installation of the disk protector 20 is facilitated by the bridge regions 25 being relatively narrow and easily foldable over the outside edge 13 of the disk 10, the main region 23 and the enlargements of the support portions 24 being less easily foldable, thereby tending to center the main sheet member 22 as the support portions 24 are folded onto the top surface 11. Optionally, an inexpensive jig can be provided for temporarily holding the bridge portions 25 against the outside edge 13 during installation.

Figure 7:
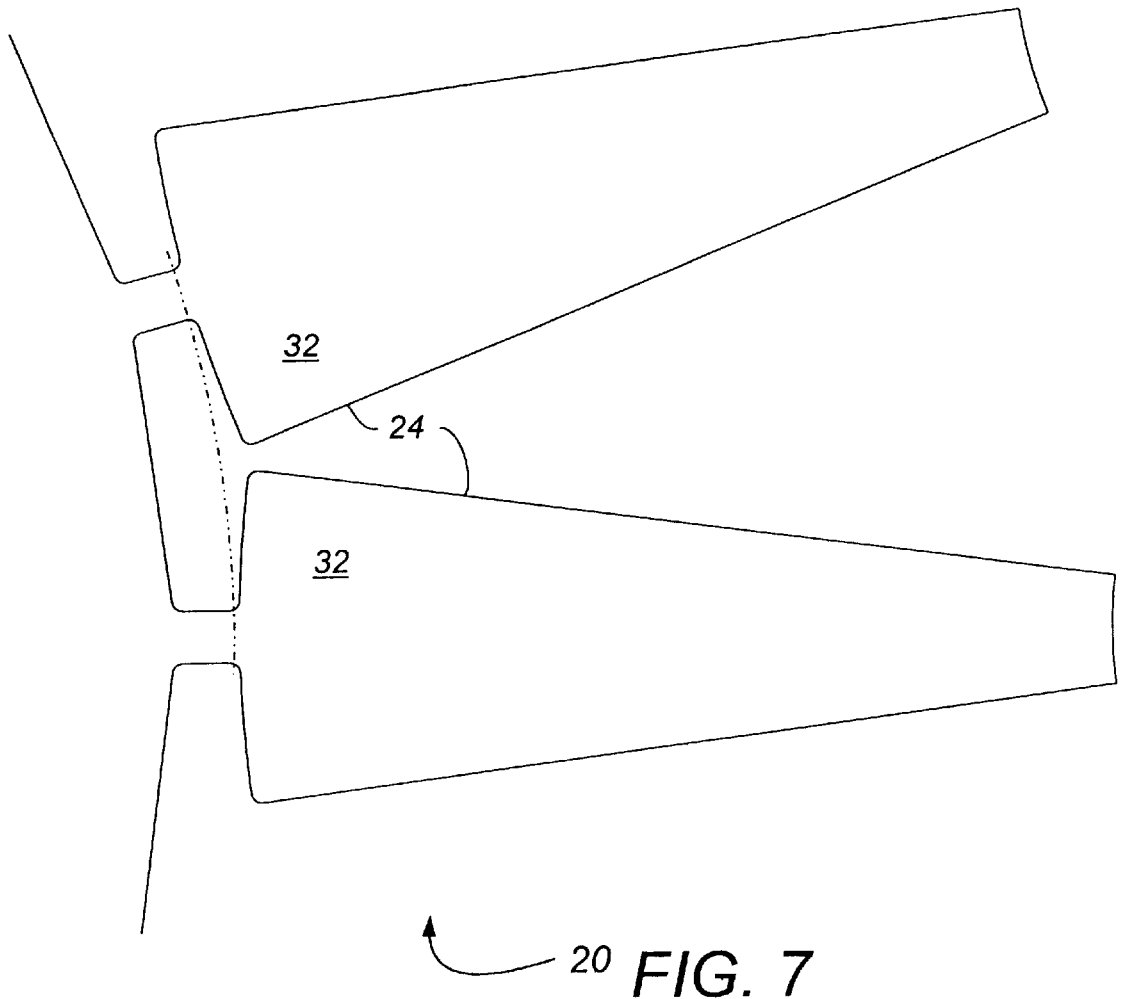
FIG. 7 is a detail view within region 7 of FIG. 6, showing an alternative configuration of the disk protector of FIG. 1.

With further reference to FIG. 7, an alternative configuration of the disk protector 20 has the adhesive coating 32 applied to the enlargements of the support portions 24 of the main sheet member 22. In this configuration, the retainer sheet 30 is not normally used, and installation proceeds with placement of the sheet member 22 against the bottom surface 12 of the disk 10 with the adhesive coating 32 facing toward the disk, so that the coating 32 contacts the top surface 11 in the folded condition of the support portions 24.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. A compact disk protector for an optical data storage disk, comprising:
   (a) a thin, transparent sheet having an inside diameter being larger than an inner hole of the disk, the sheet extending within and being bounded by:
      (i) a main region for placement against a first side of the disk, the main region extending concentrically from the inside diameter to a main diameter being slightly less than an outside diameter of the disk; and
      (ii) a circumferentially spaced plurality of support portions extending radially outwardly from the main region to a distance being greater than a thickness of the disk beyond the disk outside diameter, each support portion having a bridge width being not greater than 5 percent of the disk outside diameter within a bridge region, the bridge region being concentric with the inside diameter and extending from the disk outside diameter radially outwardly a distance corresponding to the disk thickness; and
   (b) a holder for holding the support portions folded against a second side of the disk when the main region of the sheet is placed against the first side of the disk, the inside diameter of the sheet being maintained concentric with the disk outside diameter.

2. The apparatus of claim 1, wherein each support portion is confined within a pie-shaped region that converges toward a point located radially outwardly from the bridge region and spaced approximately half of the disk outside diameter therefrom, the pie-shaped region subtending an angle corresponding to an angular spacing of the support portions for permitting the support portions to be folded against the second disk surface without overlapping.

3. The apparatus of claim 2, wherein the support portion is further confined outside of a circular clearance region being larger than the inside hole of the disk and centered at the point.

4. The apparatus of claim 2, wherein a heel portion of the pie-shaped region is within a circular heel region being smaller than the disk outside diameter and centered at the point, so that, when the support portions are folded in closely facing relation over the outside perimeter of the disk and the second surface, the support portions project outwardly from the second surface only within the bridge width.

5. The compact disk protector of claim 1, comprising at least 12 of the support portions.

6. The compact disk protector of claim 5, comprising approximately 24 of the support portions.

7. The compact disk protector of claim 5, wherein the bridge width is approximately 2 percent of the disk outside diameter.

8. The compact disk protector of claim 1, having polar symmetry for preventing rotational unbalance thereof.

9. The apparatus of claim 1, further comprising an adhesive for connecting the support portions.

10. The apparatus of claim 9, wherein the adhesive is distributed on the support portions, for anchoring the support portions directly against the second disk surface.

11. The compact disk protector of claim 9, further comprising a retainer member, the retainer member being a thin, sheet having a retainer inside diameter being larger than the inner hole of the disk, the sheet being bounded within a diameter corresponding to the disk outside diameter, the adhesive being applied to one side of the retainer member, concentricity of the protector relative to the disk being maintained by the bridge portions engaging outside edge portions of the disk.

12. The compact disk protector of claim 11, wherein the retainer member is circular, having an outside diameter being concentric with the retainer inside diameter, the clearance diameter of the support portions being not smaller than the retainer inside diameter.

13. The compact disk protector of claim 11, wherein the retainer member, together with the adhesive, is transparent.

14. A protected compact disk comprising a data storage disk in combination with the compact disk protector of claim 1, the disk being confined between the main region and the support portions.

15. A compact disk protector for an optical data storage disk, comprising:
   (a) a thin, transparent sheet having an inside diameter being larger than an inner hole of the disk, the protector having polar symmetry for preventing rotational unbalance thereof, the sheet extending within and being bounded by:
      (i) a main region for placement against a first side of the disk, the main region extending concentrically from the inside diameter to a main diameter being slightly less than an outside diameter of the disk; and
      (ii) approximately 24 circumferentially spaced support portions extending radially outwardly from the main region to a distance being greater than a thickness of the disk beyond the disk outside diameter, each support portion having a bridge width being not greater than 2 percent of the disk outside diameter within a bridge region, the bridge region being concentric with the inside diameter and extending from the disk outside diameter radially outwardly a distance corresponding to the disk thickness, each support portion being confined within a pie-shaped region that converges toward a point located radially outwardly from the bridge region and spaced approximately half of the disk outside diameter therefrom, the pie-shaped region subtending an angle corresponding to an angular spacing of the support portions for permitting the support portions to be folded against the second disk surface without overlapping, each support portion being further confined outside a circular clearance region being larger than the inside hole of the disk and centered at the point and within a circular heel region being smaller than the disk outside diameter and centered at the point, so that, when the support portions are folded in closely facing relation over the outside perimeter of the disk and the second surface, the inside diameter of the sheet is maintained concentric with the disk outside diameter by the bridge portions engaging outside edge portions of the disk and the support portions project outwardly from the second surface only within the bridge width; and
   (b) a retainer member for holding the support portions folded against a second side of the disk when the main region of the sheet is placed against the first side of the disk, the retainer member being a thin, sheet having a retainer inside diameter being larger than the inner hole of the disk, the sheet being bounded within a diameter corresponding to the disk outside diameter, an adhesive being applied to one side of the retainer member, concentricity of the protector relative to the disk being maintained.

16. A method for protecting a compact disk having an inner hole therein, comprising the steps of:

(a) providing a thin, transparent sheet having an inside diameter being larger than an inner hole of the disk, the sheet having a main region, the main region extending concentrically from the inside diameter to an intermediate diameter being slightly less than an outside diameter of the disk, and a circumferentially spaced plurality of support portions extending radially outwardly from the main region;

(b) placing the main region against a first side of the disk with the support portions extending from the first side;

(c) folding each of the support portions over an edge portion of the disk into facing relation to a second side of the disk; and (d) connecting the support portions for retaining the disk between the main region and the support portions.

17. The method of claim 16, wherein the connecting step comprises applying an adhesive to the supporting portions.

18. The method of claim 17, wherein the connecting step further comprises using the adhesive directly between the support portions and the second side of the disk.

19. The method of claim 17, wherein the connecting step comprises the further steps of:

(a) providing a thin sheet retainer member having the adhesive on one surface thereof; and (b) placing the retainer against the support portions with the adhesive therebetween while maintaining the support portions folded against the second side of the disk.

* * * * *